United States Patent
Kitagawa et al.

(10) Patent No.: US 8,487,869 B2
(45) Date of Patent: Jul. 16, 2013

(54) MANIPULATION INPUT APPARATUS

(75) Inventors: Nozomi Kitagawa, Okazaki (JP); Takuo Yamamoto, Toyota (JP); Hiroshi Nishimura, Anjo (JP)

(73) Assignee: DENSO CORPORATION, Kariya (JP)

( * ) Notice: Subject to any disclaimer, the term of this patent is extended or adjusted under 35 U.S.C. 154(b) by 65 days.

(21) Appl. No.: 13/024,418

(22) Filed: Feb. 10, 2011

(65) Prior Publication Data

US 2011/0210914 A1    Sep. 1, 2011

(30) Foreign Application Priority Data

Feb. 12, 2010    (JP) .................................. 2010-29262

(51) Int. Cl.
*G09G 5/00* (2006.01)
*G06F 3/033* (2006.01)

(52) U.S. Cl.
USPC .......................................... 345/156; 345/157

(58) Field of Classification Search
USPC ................................................ 345/156–184
See application file for complete search history.

(56) References Cited

U.S. PATENT DOCUMENTS

| | | | | |
|---|---|---|---|---|
| 7,742,857 B2 * | 6/2010 | Iwamoto et al. | ................. | 701/36 |
| 7,773,075 B2 * | 8/2010 | Otsuka et al. | ................. | 345/173 |
| 2003/0128103 A1 * | 7/2003 | Fitzpatrick et al. | ........ | 340/425.5 |
| 2004/0155863 A1 * | 8/2004 | Sakamaki et al. | ............ | 345/156 |
| 2006/0143580 A1 * | 6/2006 | Gimness et al. | ............. | 715/856 |
| 2006/0256098 A1 * | 11/2006 | Gregorio et al. | ............. | 345/184 |
| 2007/0057915 A1 * | 3/2007 | Yamauchi | ...................... | 345/156 |
| 2007/0126698 A1 * | 6/2007 | Iwamoto et al. | ............. | 345/156 |
| 2008/0053248 A1 | 3/2008 | Oki | | |
| 2009/0187300 A1 * | 7/2009 | Everitt et al. | ................... | 701/29 |
| 2010/0073291 A1 * | 3/2010 | Hisatsugu et al. | ............ | 345/161 |
| 2010/0117957 A1 * | 5/2010 | Takenaka et al. | ............ | 345/156 |
| 2011/0107272 A1 * | 5/2011 | Aguilar | ........................ | 715/853 |
| 2011/0164062 A1 * | 7/2011 | Nakamura et al. | ........... | 345/660 |

FOREIGN PATENT DOCUMENTS

| | | |
|---|---|---|
| JP | 2005-135324 A | 5/2005 |
| JP | A-2009-104309 | 5/2009 |
| JP | 2010-20520 A | 1/2010 |

OTHER PUBLICATIONS

Office Action mailed Mar. 12, 2013 in corresponding JP Application No. 2010-029262 (and English translation).

* cited by examiner

*Primary Examiner* — Amare Mengistu
*Assistant Examiner* — Sarvesh J Nadkarni
(74) *Attorney, Agent, or Firm* — Posz Law Group, PLC (57) ABSTRACT

An extra wide display device displays a primary window and a secondary window side by side. A pointer is displayed on the display device. A position indicated by the pointer is moved by manipulating a switch. When the primary window is displayed, the switch has a primary manipulation region. When the secondary window is displayed, the switch has a secondary manipulation region. The primary manipulation region and the secondary manipulation region are designated to contain an overlapped region between them.

5 Claims, 9 Drawing Sheets

FIG. 7A SW POSITION

FIG. 7B

FIG. 7C SW POSITION

FIG. 7D

FIG. 7E SW POSITION

MANIPULATION INPUT APPARATUS

CROSS REFERENCE TO RELATED APPLICATION

The present application is based on and incorporates herein by reference Japanese Patent Application No. 2010-29262 filed on Feb. 12, 2010.

FIELD OF THE INVENTION

The present invention relates to a manipulation input apparatus.

BACKGROUND OF THE INVENTION

[Patent document 1] JP-2005-135324 A

For example, Patent document 1 recites a display manipulation system using a haptic mechanism as an input apparatus for a in-vehicle navigation apparatus. This display manipulation system is provided with an input means including a joy stick which can be manipulated by the motion of the index finger and the middle finger of the driver. Thus, the driver moves the index finger and middle finger in the state, where the wrist's is half-fixed, to thereby manipulate the joy stick. For example, the display position of the pointer is thus moved on a display window to execute a selection. In addition, as an alternative of the joy stick, a general input means includes a trackball-shaped one.

In this display manipulation system, the motion of the joy stick can be directly applied to the movement of the input target such as a pointer on a display window, for example. Accordingly, the driver can move the joy stick so as to move the pointer etc.; it is thus easy to confirm the sense of moving the pointer. Manipulation can be easily and certainly performed. In addition, in this display manipulation system, a reactive force generator is provided to apply a reactive force to the joy stick according to the display on the display window. The reactive force is given to the joy stick so that the pointer may be guided and moved towards an intended position on the display window. Accordingly, the driver only need follow such guide so that the pointer may be guided and reached at the intended point, where the pointer is frequently moved and reached, such as a display position of a button on the display window.

In cases that the display manipulation system described in Patent document 1 is mounted in a vehicle, it is desirable to manipulate it by the motion of the index finger and middle finger. To that end, the width of the motion of the joy stick needs to be reduced or narrowed in the lateral direction (vehicle width direction or right-left direction). Thus, the whole of the motion width of the joy stick in the lateral direction is narrower than the movement width of the pointer on the display window. Therefore, the manipulation of the joy stick needs to be made finely or sensitively. This poses a problem to increase a trouble of the driver in manipulating the input means. In addition, such a problem is also posed in cases that two display windows of a first and second display windows are alongside arranged and displayed on the screen of the display device.

SUMMARY OF THE INVENTION

It is an object of the present invention to provide a manipulation input apparatus to select a point on a display device that contains a first display window and a second display window alongside or side by side. The manipulation input apparatus enables a manipulation device to be easily manipulated while enabling a selection point to be certainly selected on the display windows.

To achieve the above object, according to an example of the present invention, a manipulation input apparatus is provided as follows. A display device is configured to display a first window and a second window in a side by side arrangement. A display information designation section is configured to designate display information displayed by the display device. A manipulation section is configured to, when the display information displayed by the display device is designated, execute a manipulation within a manipulation region having a predetermined width, and output manipulation information corresponding to the executed manipulation. A manipulation information acquisition section is configured to acquire the manipulation information outputted from the manipulation section. A first selection position control section is configured to designate a selection position in the first window based on the manipulation information acquired by the manipulation information acquisition section and display a position indicator at the designated selection position. A second selection position control section is configured to designate a selection position in the second window based on the manipulation information acquired by the manipulation information acquisition section and display a position indicator at the designated selection position. Herein, a first manipulation region and a second manipulation region are designated as the manipulation region in the manipulation device. The first manipulation region is used to designate the selection position in the first window. The second manipulation region is used to designate the selection position in the second window. In cases that the manipulation device is manipulated in the first manipulation region when the position indicator is displayed in the first window, the selection position is moved within the first window based on the manipulation device being manipulated while the position indicator is displayed at the moved selection position within the first window. In cases that the manipulation device is manipulated in the second manipulation region when the position indicator is displayed in the second window, the selection position is moved within the second window based on the manipulation device being manipulated while the position indicator is displayed at the moved selection position within the second window. The first manipulation region and the second manipulation region are designated to contain an overlapped region between the first manipulation region and the second manipulation region.

Under the above configuration of the manipulation input apparatus, an overlap region is provided between a first manipulation region and a second manipulation region of the manipulation device. The first manipulation region of the manipulation device is a region where the manipulation device is enabled to output manipulation information so as to move a selection position in an input region of the first window. The second manipulation region of the manipulation device is a region where the manipulation device is enabled to output manipulation information so as to move a selection position in an input region of the second window. Accordingly, the manipulation region of the manipulation device can be made large. Therefore, while the manipulation of the manipulation device can be made easy, the selection position on the window can be selected certainly. That is, in the display device displaying the first window and the second window, the manipulation of the manipulation device is made easy in selecting the selection position in the window in the display device while the selection position in the window can be selected certainly.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Hereinafter, with reference to drawings, embodiments of the present invention are explained in detail. In the explanation of the drawing, an identical element is assigned with an identical reference number; thereby, the duplicated explanation is omitted. Moreover, for reasons of expediency in drawing, the ratios of the magnitudes of the elements or the like are not necessarily in agreement with the explanation.

(First Embodiment)

Figure 1:
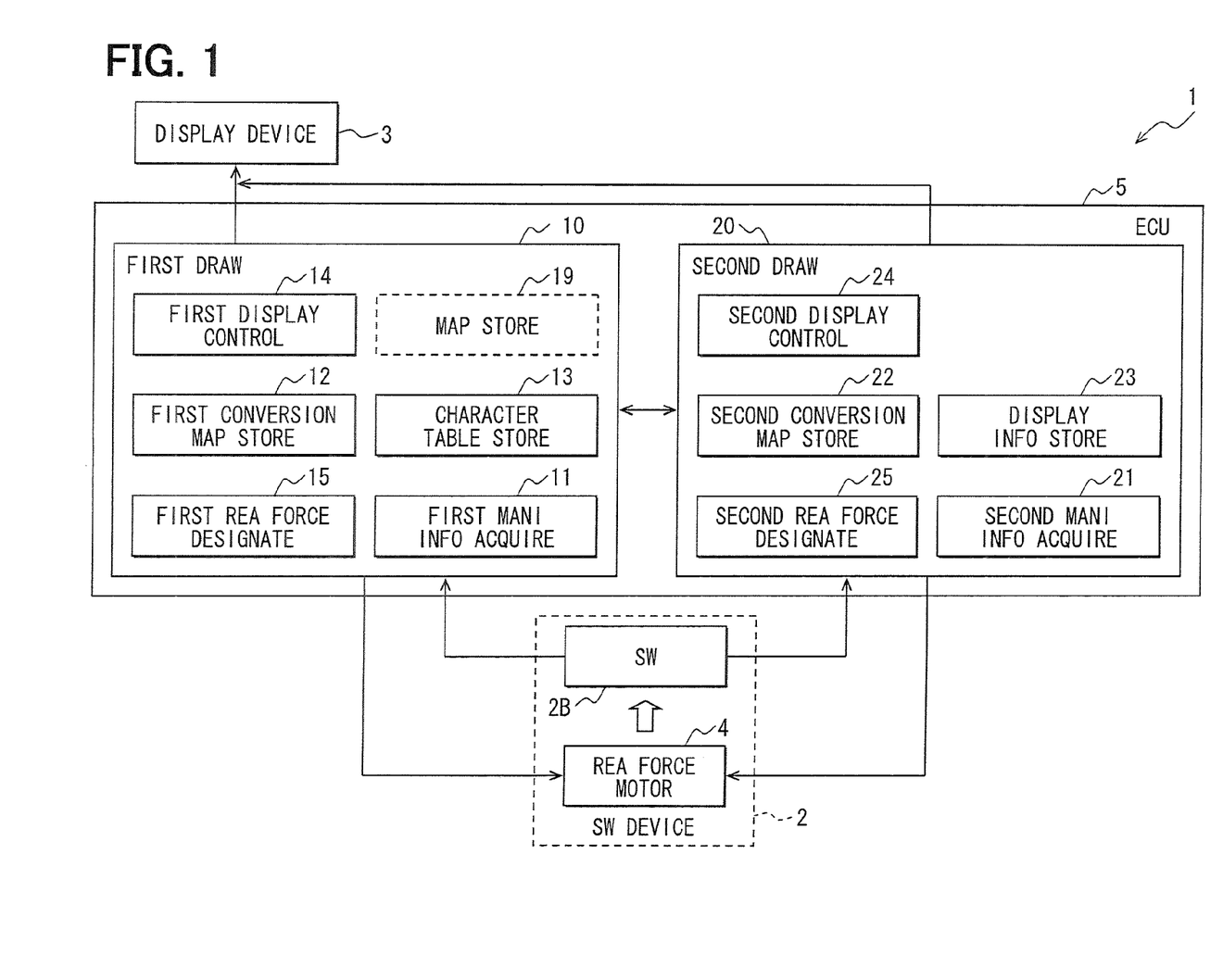
FIG. 1 is a block diagram illustrating a configuration of a manipulation input apparatus according to an embodiment of the present invention.
Figure 2:
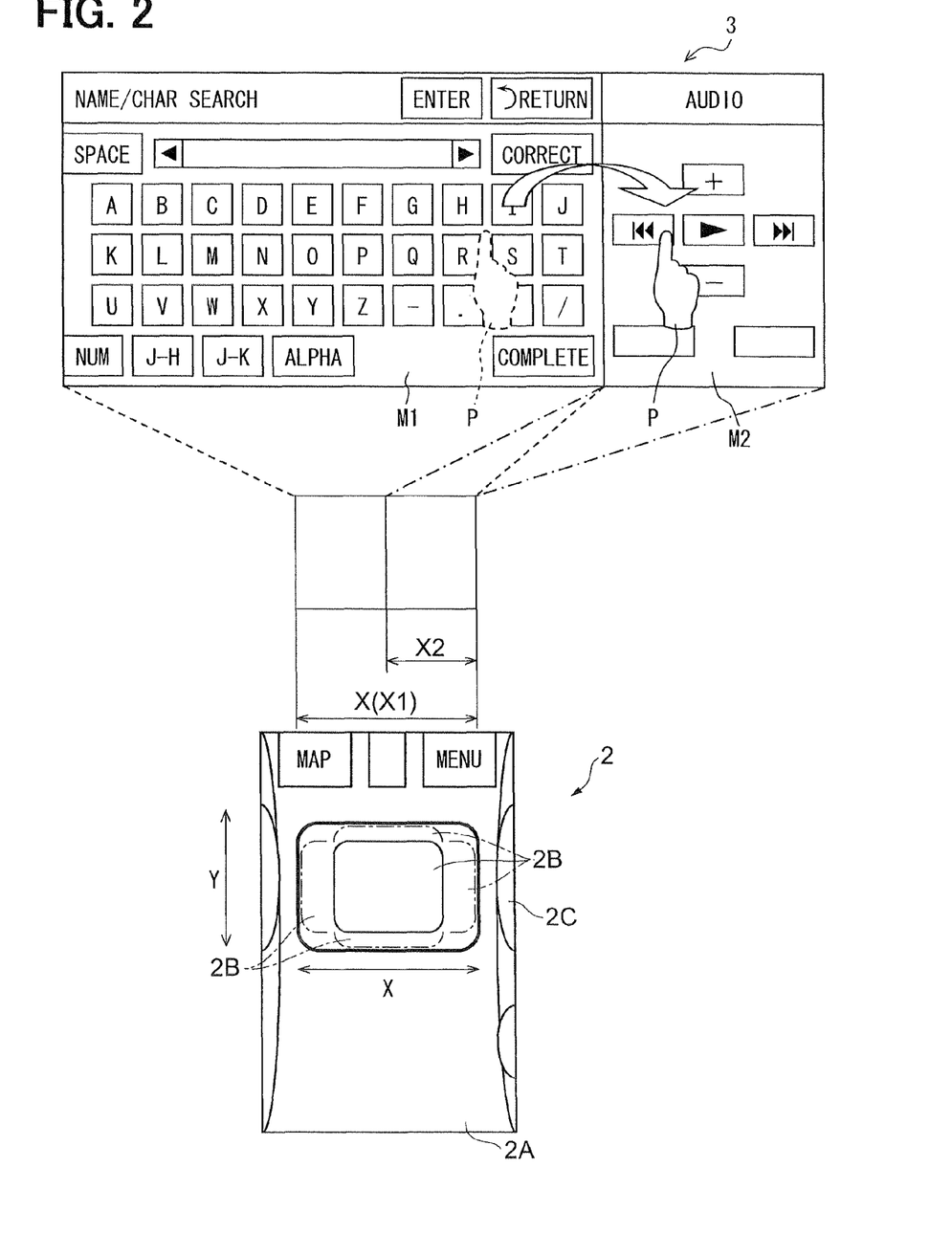
FIG. 2 illustrates (i) a plan view of a switch device and (ii) a front view of a display window on a display device corresponding to a manipulable region of a switch.

FIG. 1 is a block diagram illustrating a configuration of a manipulation input apparatus according to an embodiment of the present invention. As illustrated in FIG. 1, the manipulation input apparatus 1 according to the present embodiment includes the following: a switch device 2, an extra wide display device 3, a reactive force motor 4, and an ECU (Electronic Control Unit) 5. The switch device 2 is arranged adjacent to the side of a driver's seat in a vehicle compartment. The switch device 2 includes a switch housing 2A, a switch 2B, and a determination switch 2C, as illustrated in FIG. 2. The switch 2B, which is referred to a manipulation device, is, for instance, a joy stick that is arranged on an upper or front surface of the switch housing 2A. The determination switch 2C is arranged on a side surface of the switch housing 2A.

The switch 2B is allowed to move in a lateral direction (i.e., right-left direction) within a predetermined manipulable range X illustrated in FIG. 2. Moreover, the switch 2B is also allowed to move in a longitudinal direction (i.e., up-down direction in FIG. 2) orthogonal to the manipulable range X within a predetermined range. In other words, the manipulable region is assigned with an X-axis and Y-axis coordinates. The switch device 2 is electrically connected with a first drawing section 10 and a second drawing section 20 of the ECU 5. Furthermore, the extra wide display device 3 and the reactive force motor 4 are electrically connected to the first drawing section 10 and the second drawing section 20. When the switch 2B is manipulated, the switch device 2 transmits manipulation information according to the manipulation direction of the joystick 2B, to the first drawing section 10 and the second drawing section 20. Moreover, when the determination switch 2C is pressed, determination information is transmitted to the first drawing section 10 and the second drawing section 20.

The extra wide display device 3 is arranged in a position which can be viewed from the driver in the vehicle compartment. The extra wide display device 3 has a ratio of 9:24 between the longitudinal (up-down) length and the lateral (right-left) length, for example. Moreover as illustrated in FIG. 2, the extra wide display device 3 displays a first window M1 serving as a primary window and a second window M2 serving as a secondary window, two windows M1, M2 are displayed in a side-by-side arrangement with respect to the lateral direction of the screen of the display device 3. Moreover, the extra wide display device 3 further displays a pointer P that is a position indicator to indicate a selection position. The pointer P is basically displayed in either the primary window M1 or the secondary window M2.

When the switch 2B is manipulated, the pointer P is moved in response to the manipulation of the switch 2B. Moreover, when the pointer P is displayed in the primary window M1, the pointer P is allowed to move in a primary manipulation range X1, which is identical to the whole range of the manipulable range X of the switch 2B. Further, the primary manipulation range X1 is referred to as a first manipulation region. The movement display of the pointer P may be expressed with an animation effect.

Moreover, when the pointer P is displayed on the secondary window M2, the pointer P is allowed to move in a secondary manipulation range X2, which is a part of the manipulable range X of the switch 2B. Further, the secondary manipulation range X2 is referred to as a second manipulation region. Thus, the primarily manipulation range X1 and the secondary manipulation range X2 are provided to overlap each other. It is noted that in the case where the pointer P is displayed on the secondary window M2, if the switch 2B is separated from within the secondary manipulation range X2, the pointer P is moved to the primary window M1. In such a case, the motion display of the pointer P may be also expressed with an animation effect.

Moreover, the reactive force motor 4 is provided inside of the switch housing 2A, and supplies the switch 2B with a predetermined reactive force against the manipulation direction. That is, the reactive force motor 4 supplies the switch 2B with a reactive force that is applied in a predetermined direction and strength, which are designated with respect to each of the first drawing section 10 and the second drawing section 20.

The ECU 5 includes a CPU (Central Processing Unit), a ROM (Read Only Memory), and a RAM (Random Access Memory). The ECU 5 serves as an electronic control unit which carries out an overall control with respect to display contents displayed in the extra wide display device 3 and reactive forces supplied by the reactive force motor 4. Moreover, the ECU 5 contains the first drawing section 10 and the second drawing section 20. The first drawing section 10 includes a first manipulation information acquisition section 11, a first conversion map storage section 12, a character table storage section 13, a first display control section 14, and a first reactive force designation section 15.

Further, the first drawing section 10 includes a map storage section 19 to store road map data, which is used for displaying a road map in the primary window M1 as needed. The second drawing section 20 includes a second manipulation information acquisition section 21, a second conversion map storage section 12, a window information storage section 23, a second display control section 24, and a second reactive force designation section 25.

The first manipulation information acquisition section 11 of the first drawing section 10 acquires a coordinate (henceforth "a haptic coordinate") resulting from the manipulation of the joystick based on the manipulation information transmitted from the switch device 2. The first manipulation information acquisition section 11 generates manipulation conversion information corresponding to the acquired haptic coordinate, and outputs it to the first display control section 14 and the first reactive force designation section 15.

The first conversion map storage section 12 is provided with several conversion maps. The conversion map is used for converting the manipulation conversion information, which is outputted from the first manipulation information acquisition section 11, into a pointer display position (display coordinate) in the extra wide display device 3. The pointer display position is a position at which a selection point is indicated by the pointer serving as a position indicator. The first conversion map storage section 12 selects, out of the several conversion maps, a conversion map according to the output instruction from the first display control section 14, and outputs it to the first display control section 14.

The character table storage section 13 stores character table information on character table which is displayed in the primary window M1 of FIG. 2. The character table contains buttons representing characters (e.g., alphabetical characters in FIG. 2) while further containing an input string space, a space button, a correction button, and language change buttons (e.g., for changing to numeral characters, Japanese kana characters, Japanese hiragana characters, and alphabetical characters). The character table storage section 13 outputs character information to the first display control section 14 according to the read-out of the first display control section 14.

The first display control section 14 displays, in the primary window M1 of the extra wide display device 3, the character table read from the character table storage section 13. The first display control section 14 refers to the conversion map read from the first conversion map storage section 12 based on the manipulation conversion information outputted from the first manipulation information acquisition section 11 to thereby determine a display position of the pointer P. The pointer P is thus displayed to point out or indicate the determined display position on the extra wide display device 3.

Furthermore, the first display control section 14 outputs (i) the character window information based on the acquired character window information and (ii) the pointer display position information on the display position of the pointer P, to the first reactive force designation section 15. When determining that the pointer display position moves to a position which is separated from within the primary window M1, the first display control section 14 outputs a pointer display position switching signal to the second drawing section 20. After transmitting the pointer display position switching signal, the first display control section 14 loses the right of displaying a window (i.e., right of window display). In contrast, when newly receiving the pointer display position switching signal, the first display control section 14 acquires the right of displaying a window.

The first reactive force designation section 15 designates or sets up a reactive force given to the joystick of the switch device 2, based on the character window information and the pointer display position information outputted from the first display control section 14. For example, the calculation is made to find a reactive force which enables the pointer P to be easily located at a position corresponding to a character button in the character table. A reactive force signal corresponding to the calculated reactive force is transmitted to the reactive force motor 4. Moreover, when the pointer P is located near an outer edge of the primary window M1, the reactive force is given to the direction which is from the outer edge to an inner portion of the primary window M1

In the second drawing section 20, the second manipulation information acquisition section 21 and the second conversion map storage section 22 have functions equivalent to those of the first manipulation information acquisition section 11 and the first conversion map storage section 12, respectively. Moreover, the second reactive force designation section 25 has a function equivalent to that of the first reactive force designation section 15.

The window information storage section 23 has several window information items displayed on the second window in the extra wide display device 3. Those window information items include a navigation-use manipulation switch window information item which displays switches used in order to designate a destination at the time of using a car navigation apparatus or to designate a travel route, a car audio-use manipulation switch information item, and an air-conditioner manipulation switch information item. The display information storage section 23 outputs display information (i.e., display contents) to the second display control section 24 according to the read-out of the second display control section 24.

The second display control section 24 displays in the secondary window M2 of the extra wide display device 3 the contents based on the display information read from the display information storage section 23. The second display control section 24 refers to the conversion map read from the second conversion map storage section 22 based on the manipulation conversion information outputted from the second manipulation information acquisition section 21 to thereby determine a display position of the pointer P. The pointer P is thus displayed to point out or indicate the determined display position on the extra wide display device 3.

Furthermore, the second display control section 24 outputs (i) the content information based on the acquired display information and (ii) the pointer display position information on the display position of the pointer P, to the second reactive force designation section 25. When determining that the pointer display position is moved to a position which is separated from the secondary window M2, the second display control section 24 outputs a pointer display position switching signal to the first drawing section 10. After transmitting the pointer display position switching signal, the second display control section 24 loses the right of displaying a window. In contrast, when newly receiving the pointer display position switching signal, the second display control section 24 acquires the right of displaying a window.

The second reactive force designation section 25 designates a reactive force given to the joystick in the switch device 2, based on the display content window information and the pointer display position information outputted from the second display control section 24. For example, the calculation is made to find a reactive force which enables the pointer P to be easily located at a position corresponding to a button displayed in the secondary window M2. A reactive force signal corresponding to the calculated reactive force is transmitted to the reactive force motor 4. Moreover, when the pointer P is located near an outer edge of the secondary window M2, the reactive force is given to the direction which is from the outer edge to an inner portion of the secondary window M2.

Figure 3:
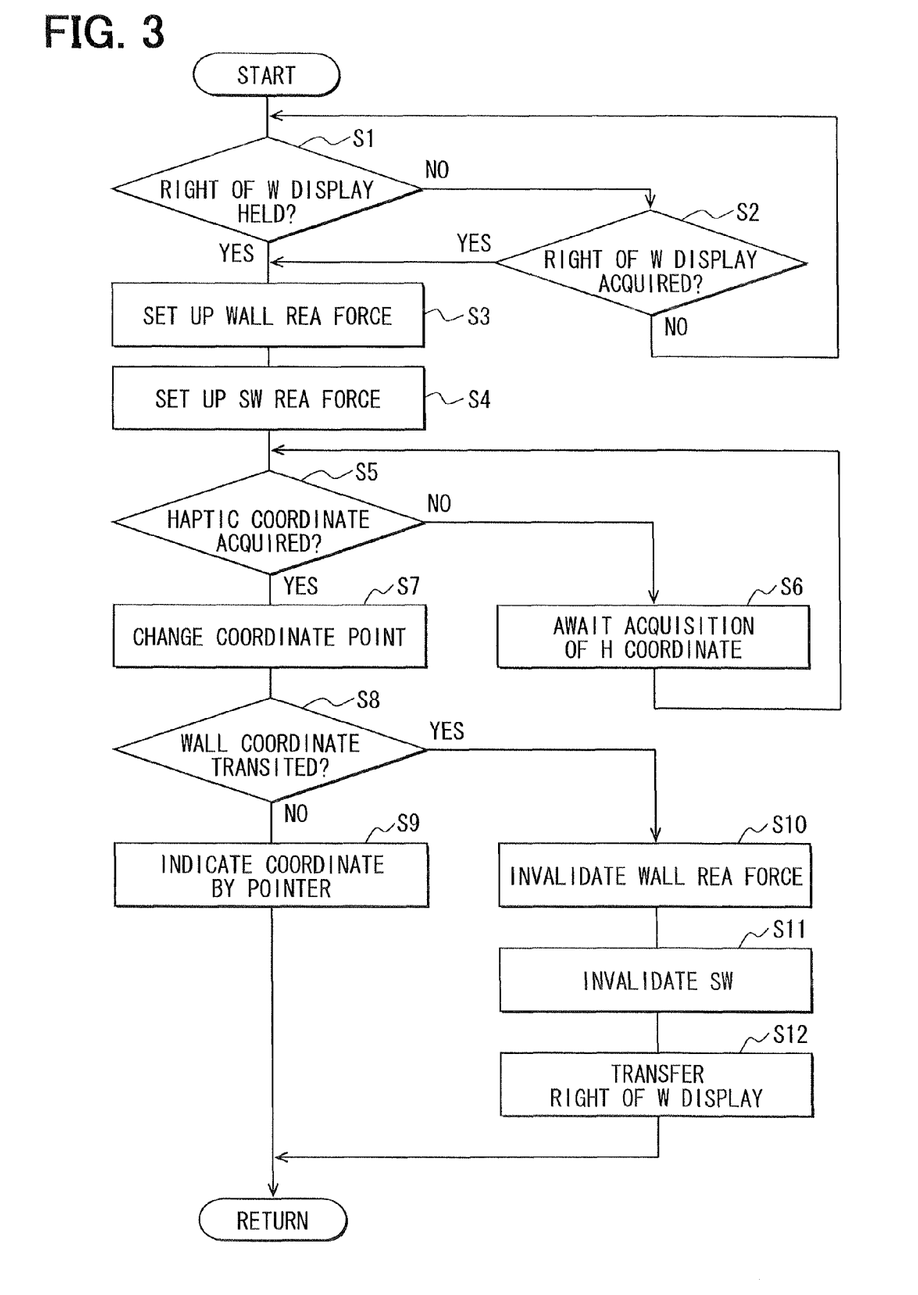
FIG. 3 is a flowchart diagram illustrating a procedure of a process in a first drawing section.

Next, the following explains an operation of the manipulation input apparatus 1 according to the present embodiment. In the manipulation input apparatus 1 according to the present embodiment, a user such as a driver manipulates the switch 2B in the switch device 2, thereby moving the position of the pointer P displayed on the extra wide display device 3. The procedure in the first drawing section 10 at this time is explained. FIG. 3 is a flowchart diagram illustrating a procedure of a process by the first drawing section 10 of the ECU 5.

It is further noted that a flowchart or the processing of the flowchart in the present application includes sections (also referred to as steps), which are represented, for instance, as S1. Further, each section can be divided into several sub-sections while several sections can be combined into a single section. Furthermore, each of thus configured sections can be referred to as a means or unit and achieved not only as a software device but also as a hardware device.

The first drawing section 10 determines whether it has a right of window display (S1), as illustrated in FIG. 3. As a result, when it is determined that it does not have a right of window display, it is determined whether the right of window display is acquired (S2). The determination as to whether the right of window display is acquired is made by determining whether the pointer display position switching signal transmitted from the second drawing section 20 is received. When it is determined that the pointer display position switching signal transmitted from the second drawing section 20 is received, it is determined that the right of window display is acquired. As a result, when it is determined that the right of window display is not acquired, the processing returns to S1 where the determination of the presence or absence of the right of window display is made while the reception of a pointer display position switching signal is awaited.

When it is determined that a right for window display is already acquired, or when it is determined that the right for window display is acquired, the right of window display is naturally assigned to the first drawing section 10. At this time, the first display control section 14 of the first drawing section 10 displays the character table based on the character table read out from the character table storage section 13 in the primary window M1 of the extra wide display device 3. Moreover, a wall coordinate is designated or set up as a reference position at the time of transferring from the primary window M1 to the secondary window M2. In the extra wide display device 3, an X-axis is assigned to the lateral (right-left) coordinate axis; a Y-axis is assigned to the longitudinal (up-down) coordinate axis. The wall coordinate is designated with respect to the X-axis.

Figure 4A:
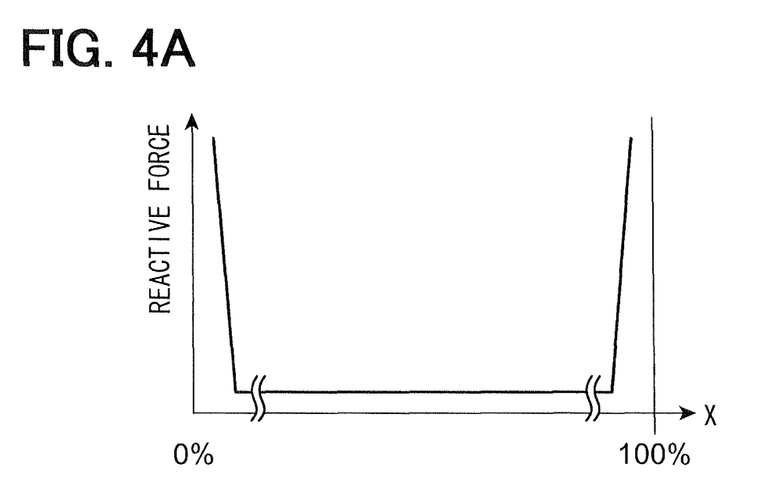
FIG. 4A is a diagram illustrating a relation between (i) a coordinate in an axis of abscissa corresponding to a primary window and (ii) a reactive force given to the switch.

When having a right of window display, the first drawing section 10 designates or sets up a wall reaction force (S3). The wall reaction force is a reactive force given to the switch 2B when the display position of the pointer P approaches near an edge of a window. At this time, the pointer P is displayed in the primary window M1. Thus, as illustrated in FIG. 4A, a wall reaction force is designated which the reactive force motor 4 supplies to the switch 2B near either a right or left outer edge of the primarily manipulation range X1 corresponding to the primary window M1. The direction in which the wall reaction force is supplied is from the either the right or left outer edge into an inner portion of the primarily manipulation range X1 Any consideration with respect to a switch reactive force other than the wall reactive force is not taken into in the reactive force illustrated in FIG. 4A.

Thus, after the wall reaction force is designated, the switch reactive force is then designated (S4). Such a switch reactive force signifies a reactive force supplied to assist the manipulation of the switch 2B when manipulating the switch 2B. For example, the reactive force is given so that the attraction may occur at the position where the pointer P is frequently located within the window. When designating the switch reactive force, the reactive force is given to the switch 2B so that the switch 2B may be easily located at each of the various buttons in the character table or the like. As explained above, any consideration with respect to a switch reactive force other than the wall reactive force is not taken into in the reactive force illustrated in FIG. 4A.

After the switch reactive force is designated in this manner, the manipulation information transmitted from the switch device 2 is received. It is then determined whether a haptic coordinate is acquired (S5). As a result, when it is determined that a haptic coordinate is not acquired, the manipulation information transmitted from the switch device 2 is awaited while acquisition of a haptic coordinate is awaited (S6). Thus, the processing at S5 is repeated until a haptic coordinate is acquired.

In contrast, when it is determined that a haptic coordinate is acquired, the coordinate point used as the display position of the pointer P is changed (S7) based on the acquired haptic coordinate. Then, it is determined whether a wall transit occurs with respect to the display position of the pointer P (S8). The determination as to whether a wall transit occurs or not is executed by determining whether the coordinate position of the X-axis of the pointer P transits or crosses over the wall coordinate.

As a result, when it is determined that any wall transit does not occur, the pointer display process is executed which moves the pointer P to the position according to the acquired haptic coordinate (S9). The processing in the first drawing section 10 is ended. In addition, when it is determined that a wall transit occurs, the designation or set-up of the wall reaction force is invalidated (S10).

Then, the invalidation of the switch is set up (S11). Setting up of the invalidating of the switch causes any control for moving the pointer P in the primary window M1 to be disabled even when the switch device 2 is manipulated. Then, the pointer display position switching signal is transmitted to the second drawing section 20. The right of window display is thereby transferred (S12), ending the process of the first drawing section 10.

In addition, the second drawing section 20 executes a control comparable to that of the first drawing section 10. Thus, whichever of the first drawing section 10 or the second drawing section 20 having a right of window display can control the movement display of the pointer P. It is noted that the second drawing section 20 executes a display control of the pointer P in the secondary window M2. Therefore, the set-up of the wall reaction force by the second drawing section 20 differs from that by the first drawing section 10.

Figure 4B:
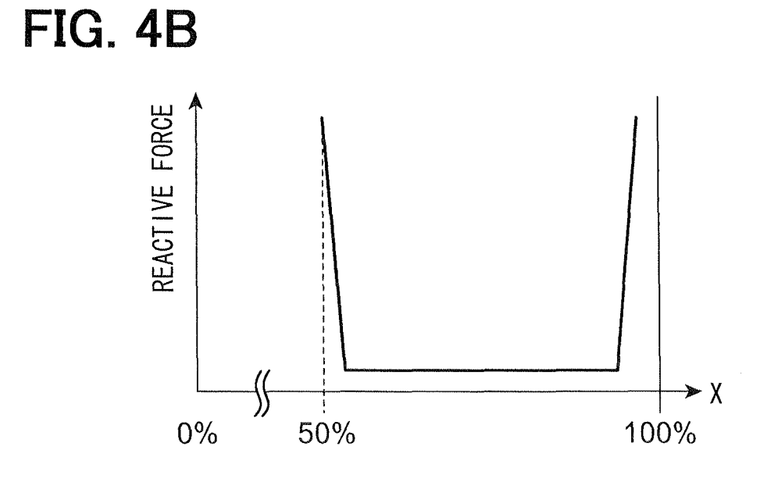
FIG. 4B is a diagram illustrating a relation between (i) a coordinate in an axis of abscissa corresponding to a secondary window and (ii) a reactive force given to the switch.

When the control is executed by the second drawing section 20, the pointer P is displayed in the secondary window M2. Thus, as illustrated in FIG. 4B, a wall reaction force is designated which the reactive force motor 4 supplies to the switch 28 near either a right or left outer edge of the secondary manipulation range X2 corresponding to the secondary window M2.

Figure 5A:
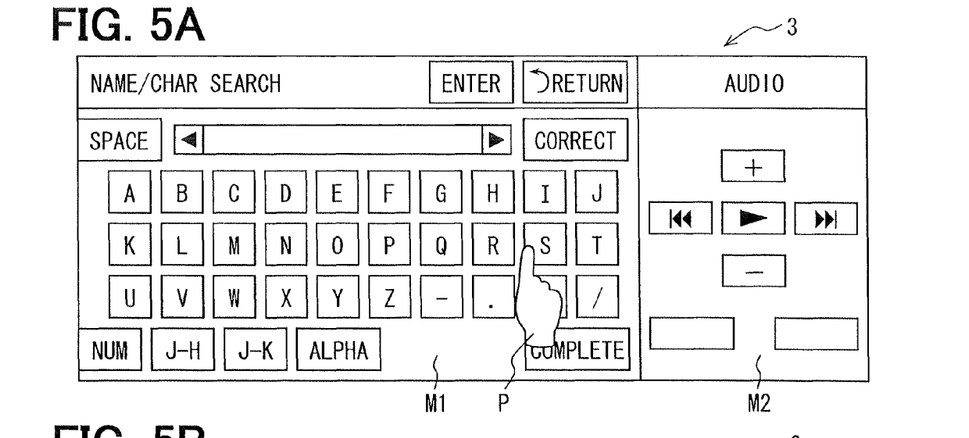
FIG. 5A is a diagram illustrating an example of a display window of the display device where a pointer is displayed in the primary window.

In the manipulation input apparatus 1 according to the present embodiment, the manipulation of the switch 2B enables the movement or transfer of the pointer P between the primary window M1 and the secondary window M2 as well as the selection of the position of the pointer P. For example, as illustrated in FIG. 5A, when the pointer P illustrated using an image of a person's finger is shown in the primary window M1, the pointer P is movable within the primary window M1.

Figure 5B:
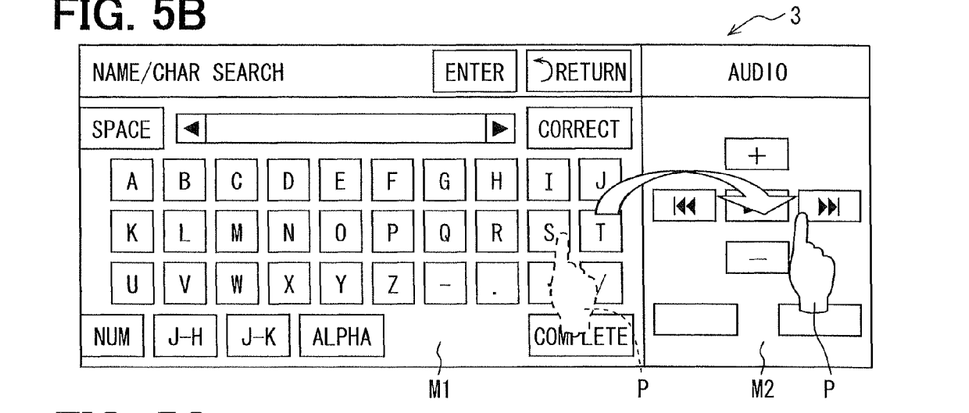
FIG. 5B is a diagram illustrating an example of a display window appearing after the pointer is transferred into the secondary window.

In addition, when the pointer P manipulated by the switch 2B is moved up to a position at which a wall transit from the primary window M1 occurs, the display position of the pointer P is transferred from the primary window M1 to the secondary window M2 as illustrated in FIG. 5B. In such a case, the transfer display of the pointer P is expressed with an animation effect. It is noted that when the transfer is made from the primary window M1 to the secondary window M2, the switch 2B is located at the right edge of the manipulation range X1. Accordingly, after transferring to the secondary window M2, the display position of the pointer P is located at the right edge of the secondary window M2.

Figure 5C:
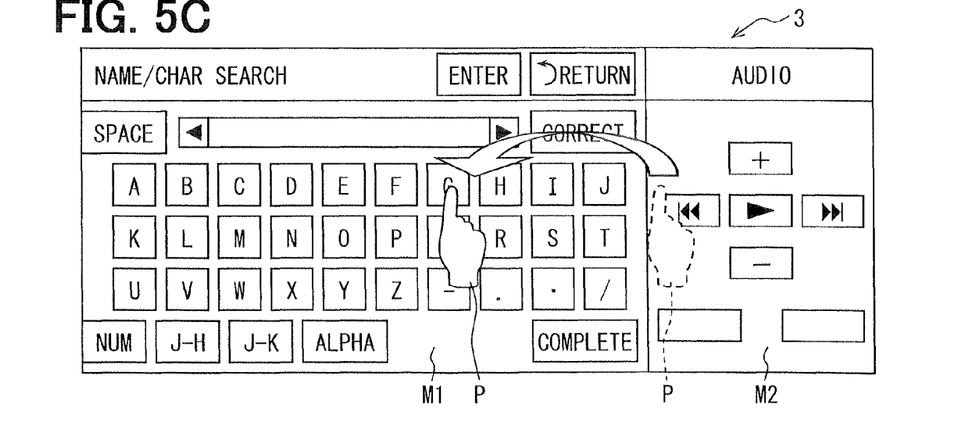
FIG. 5C is a diagram illustrating an example of a display window appearing after the pointer is further transferred into the primary window.

Furthermore, in the case where the pointer P is located in the secondary window M2, when the pointer P manipulated by the switch 2B is moved to, a position at which a wall transit from the secondary window M2 occurs, the display position of the pointer P is transferred from the secondary window M2 to the primary window M1 as illustrated in FIG. 5C. In such a case, the motion display of the pointer P may be also expressed with an animation effect. As illustrated in FIG. 4B, the wall coordinate or wall transit from the secondary window M2 is designated at an approximately intermediate point of the manipulable range X of the switch 2B. It is noted that when the transfer is made from the secondary window M2 to the primary window M1, the switch 2B is located at an approximately intermediate position of the manipulation range X1. Accordingly, after transferring to the primary window M1, the display position of the pointer P is located at an approximately intermediate position of the primary window M1. Thus, after transferring to the primary window M1, the pointer P is located near the intermediate position of the primary window M1; thereby, the display position of the pointer P can be relatively equally quickly moved to any position within the primary window M1.

In the manipulation input apparatus 1 according to the present embodiment, the position or selection position of the pointer P can be moved by manipulating the switch device 2. Furthermore, only the manipulation of the switch 2B enables the transfer from the primary window M1 to the secondary window M2 as well as the transfer from the secondary window M2 to the primary window M1.

Now, for example, suppose the case where a manipulation range relative to the primary window M1 is set up in a part of the manipulable range of the switch 2B while a manipulation range relative to the secondary window M2 is set up in the remaining part. In such a case, a manipulable range of the switch 2B relative to each of the manipulation ranges relative to the primary window M1 and the secondary window M2 becomes relatively narrower, thereby requiring fine manipulation of the switch 2B in the narrower manipulable range. It becomes difficult to select a movement point of the pointer P.

In contrast, according to the manipulation input apparatus 1 of the present embodiment, the primary manipulation range X1 of the switch 2B at the time of the pointer P being shown in the primary window M1 and the secondary manipulation range X2 of the switch 2B at the time of the pointer P being shown in the secondary window M2 overlap each other in part. Accordingly, the manipulable range of switch 2B can be made wider than that of the case where the manipulable range X of the switch 2B is divided into two parts. Therefore, while the manipulation of the manipulation device can be executed easy, the selection point on the window can be selected more certainly.

(Other Embodiments)

The following describes another embodiment of the manipulation input apparatus of the present invention. FIGS. 6A to 6E illustrate images displayed in the display device and the positions of the switch 2B in the manipulable range. The manipulation input apparatus of the present embodiment has a configuration equivalent to that of the first embodiment except that the first drawing section 10 of the ECU 5 needs to include the map storage section 19. In addition, the window information storage section 23 in the second drawing section 20 in the ECU 5 stores a window switchover information to execute window switchover between several windows such as a car audio-use manipulation switch window, and a low fuel consumption driving state window.

Figure 6A:
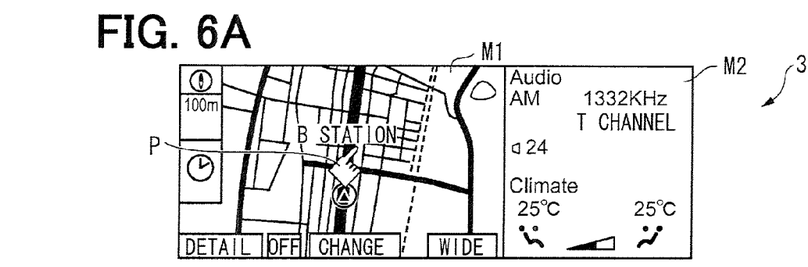
FIG. 6A is a diagram illustrating an example of an image of the primary window.
Figure 6B:
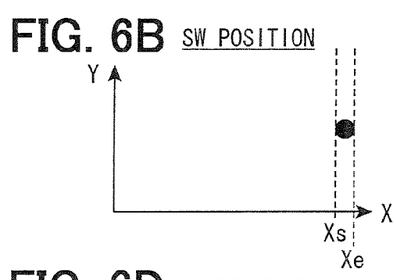
FIG. 6B is a diagram illustrating a coordinate of a position of the switch at the time of displaying the image of the primary window posterior to that of FIG. 6A.

As illustrated in FIG. 6A, in the manipulation input apparatus 1 of the present embodiment, the primary window M1 displays map information while the secondary window M2 displays a manipulation switch window for a car audio or the like. Now, suppose the case that the pointer P is displayed in the primary window M1 (see FIG. 6A). In such a case, the switch 2B is moved near a right edge of the manipulable range X, as illustrated in FIG. 6B. In FIG. 6B, a range where a wall reaction force is, applied is illustrated as being between a start point Xs and an end point Xe.

Figure 6C:
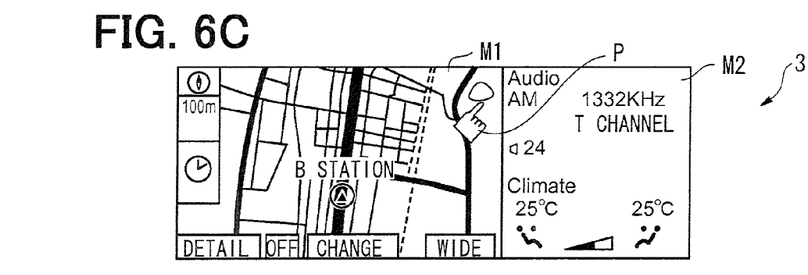
FIG. 6C is a diagram illustrating an image of the primary window posterior to that of FIG. 6A.

When the position of the switch 2B transits the start point Xs and reaches short of the end point Xe, the pointer P is moved near the right edge of the primary window M1, as illustrated in FIG. 6C. At this position, the wall reaction force applied to the switch 2B is great; thus, it is easy for the driver to stop the pointer P at this position.

Figure 6D:
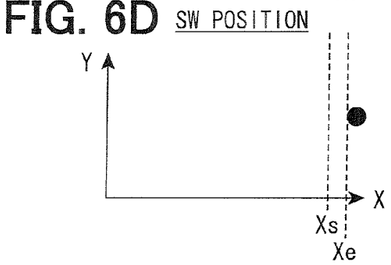
FIG. 6D is a diagram illustrating a coordinate of a position of the switch at the time of displaying the image of the primary window posterior to that of FIG. 6C.
Figure 6E:
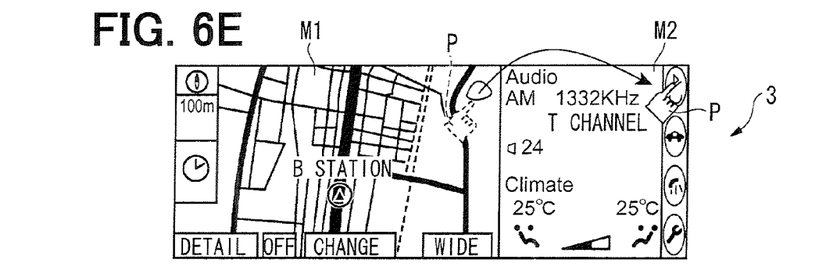
FIG. 6E is a diagram illustrating an image of the primary window posterior to that of FIG. 6C.

Then, as illustrated in FIG. 6D, the driver moves the switch 2B to the right-hand side of the end point Xe by exceeding the wall reaction force to thereby cause the switch 2B crosses the wall reaction force end point Xe. As a result, as illustrated in FIG. 6E, the drawing or display of the pointer P in the primary window M1 is erased whereas the pointer P is drawn or displayed in the secondary window M2. Thus, the display position of the pointer P is transferred from the primary window M1 to the secondary window M2. At this time, the second drawing section 20 displays a switchover window to execute a display window switchover as a hidden switch near a right edge of the secondary window M2. Thus, when the pointer P is moved into the secondary window M2 from the primary window M1, it is located on the switchover window. Accordingly, the driver can select easily windows displayed in the secondary window M2.

Figure 7A:
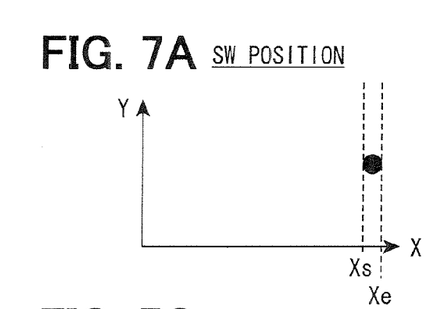
FIG. 7A is a diagram illustrating a coordinate of, a position of the switch at the time of displaying the image of the primary window posterior to that of FIG. 6E.
Figure 7B:
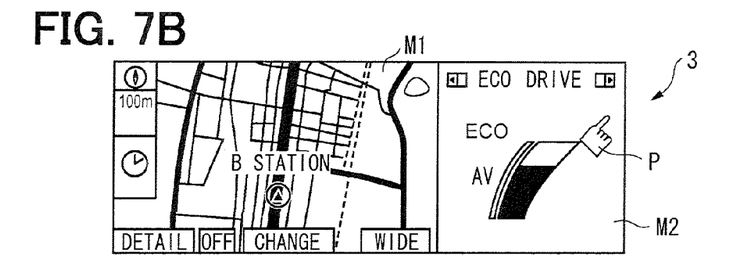
FIG. 7B is a diagram illustrating an image of the primary window posterior to that of FIG. 6E.

Furthermore, a switchover button in the switchover window is selected to thereby display an intended window in the secondary window M2. Then, as illustrated in FIG. 7A, the position of the switch 2B is moved to the left-hand side of the end point Xe of the wall reaction force, thereby eliminating the switchover window as illustrated in FIG. 7B. Thus, the window selected by the driver (i.e., low fuel consumption driving state window in FIG. 7A) is displayed in the secondary window M2.

Figure 7C:
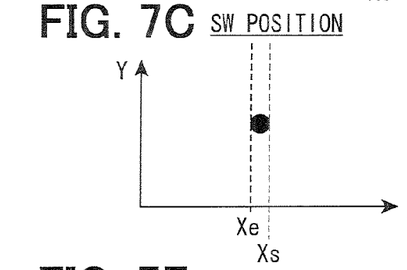
FIG. 7C is a diagram illustrating a coordinate of a position of the switch at the time of displaying the image of the primary window posterior to that of FIG. 7B.
Figure 7D:
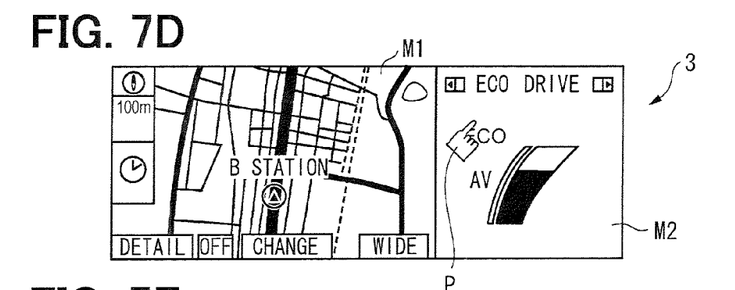
FIG. 7D is a diagram illustrating an image of the primary window posterior to that of FIG. 7B.

After the pointer P is moved in the secondary window M2, the wall reaction force start point Xs and the wall reaction force end point Xe are designated in an approximately intermediate position of the manipulable range X of the switch 2B as illustrated in FIG. 7C Then, as illustrated in FIG. 7D, the secondary window M2 is displayed until the switch 2B reaches a position short of the wall reaction force end point Xe.

Figure 7E:
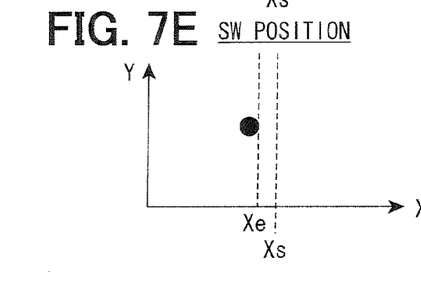
FIG. 7E is a diagram illustrating a coordinate of a position of the switch at the time of displaying the image of the primary window posterior to that of FIG. 7D.
Figure 7F:
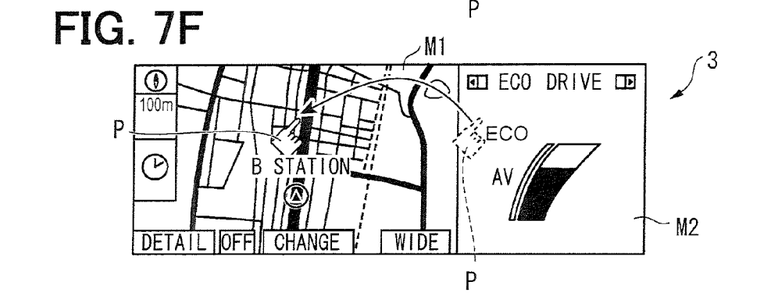
FIG. 7F is a diagram illustrating an image of the primary window posterior to that of FIG. 7D.

As illustrated in FIG. 7E, when the switch 2B transits the wall reaction force end point Xe and is moved to the left-hand side of the end point Xe, the drawing of the pointer P in the secondary window M2 is erased whereas the pointer P is drawn in the primary window M1. Thus, the display position of the pointer P is transferred from the secondary window M2 to the primary window M1 as illustrated in FIG. 7F.

As explained above, in the present embodiment, the map information may be displayed in the primary window M1 whereas a switch window or low fuel consumption driving state window may be displayed in the secondary window M2. In addition, a switchover window may be displayed as a hidden switch in the secondary window M2. Furthermore, when the display of the pointer P is moved into the secondary window M2 from the primary window M1, the hidden switch is displayed and the pointer P is displayed on the hidden switch. It may be thus easy for the driver to select a window in the secondary window M2 just after the pointer P is moved into the secondary window M2.

Figure 8A:
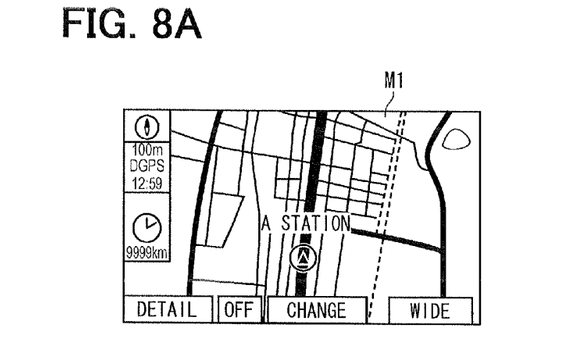
FIG. 8A is a diagram illustrating an example of an image of the primary window.
Figure 8B:
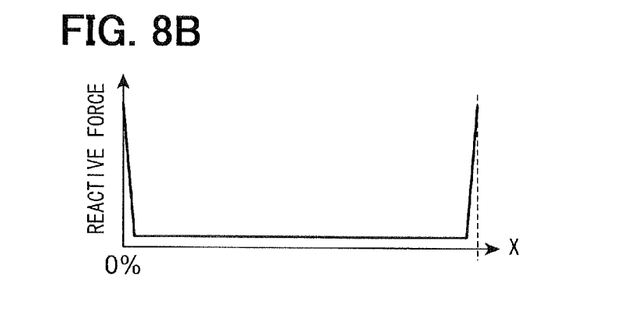
FIG. 8B is a diagram illustrating an example of a relation between (i) a coordinate in an axis of abscissa corresponding to the primary window and (ii) a reactive force given to the switch.

In addition, a great reactive force is applied to both right and left edges of each of the primary window M1 and the secondary window M2. Such a reactive force may be applied in a different manner. For example, a reactive force is first applied in the primary window M1 illustrated in FIG. 8A in a manner illustrated in FIG. 8B. When the determination switch 2C is then pressed at an optional position, the reactive force may be applied in a manner illustrated in FIG. 8C.

Figure 8C:
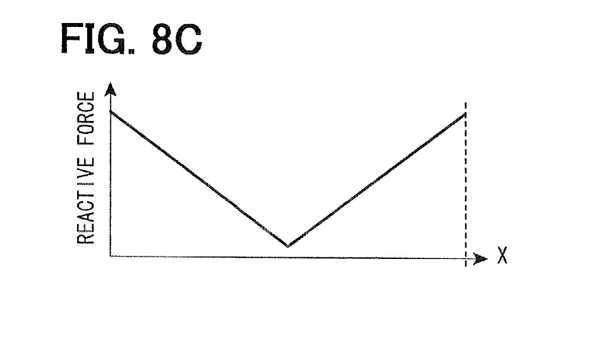
FIG. 8C is a diagram illustrating another example of a relation between (i) a coordinate in an axis of abscissa corresponding to the primary window and (ii) a reactive force given to the switch.
Figure 8D:
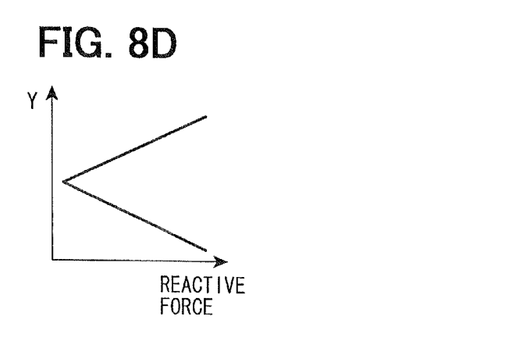
FIG. 8D is a diagram illustrating a relation between (i) a coordinate in an axis of ordinates corresponding to the primary window and (ii) a reactive force given to the switch.

In FIG. 8C, the reactive force is strengthened as the switch 2B approaches either right or left edge. When moving the switch 2B in a lateral direction, the acceleration and deceleration of the scroll speed can be executed in the lateral direction (right-left direction) in the primary window M1. Similarly, in FIG. 8D, the reactive force is strengthened as the switch 2B approaches either upper or lower edge. When moving the switch 2B in a longitudinal direction, the acceleration and deceleration of the scroll speed can be executed in the longitudinal direction (up-down direction) in the primary window M1.

Figure 9A:
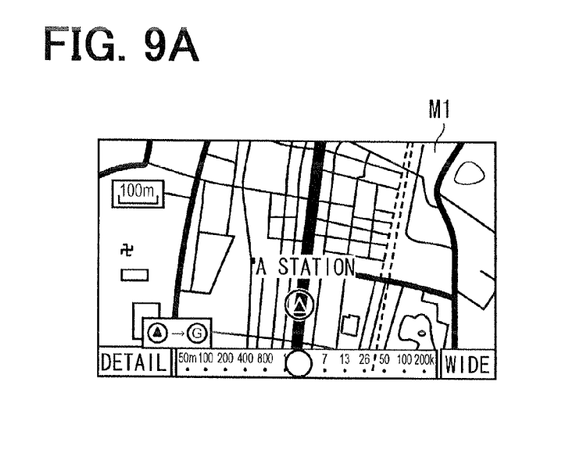
FIG. 9A is a diagram illustrating an example of an image of the primary window.
Figure 9B:
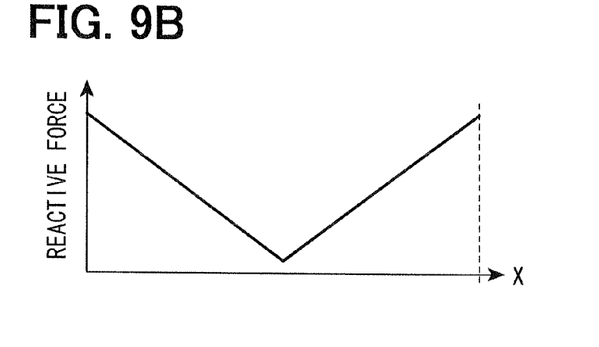
FIG. 9B is a diagram illustrating an example of a relation between (i) a coordinate in an axis of abscissa corresponding to the primary window and (ii) a reactive force given to the switch.
Figure 9C:
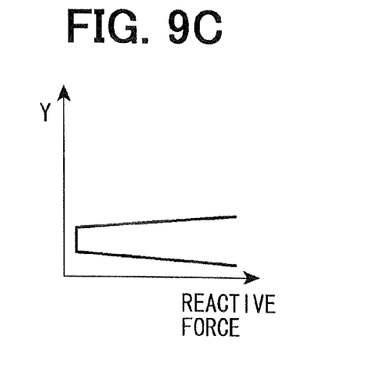
FIG. 9C is a diagram illustrating a relation between (i) a coordinate in an axis of ordinates corresponding to the primary window and (ii) a reactive force given to the switch.

Furthermore, in the above embodiment, although the wall reaction force is basically set up in the lateral direction, it may be set up in the longitudinal direction. For example, as illustrated in FIG. 9A, there is a case where a manipulation window (i.e., map scale change window is shown in the lowermost portion of FIG. 9A) is arranged and displayed. In such a case, as illustrated in FIG. 9C, a wall reactive force may be set up in the longitudinal direction at a position where the map scale change window is displayed. Further, as illustrated in FIG. 9B, any wall reactive force is not set up in the lateral direction whereas a reactive force may be set up to be strengthened as approaching either right or left edge in the lateral direction.

The preferred embodiment of the present invention is described in the above; however, the present invention is not limited to the above embodiments. In the above embodiments, the first window serving as a primary window and the second window serving as a secondary window are arranged side-by-side along a right-left direction. In contrast, two windows may be arranged side-by-side along an up-down direction. In this case, a wall reaction force may be desirably set up in an up-down (longitudinal) direction.

Further, in the above embodiment, the map information is displayed in the primary window M1 whereas the manipulation switch window information (e.g., for an audio) is displayed in the secondary window M2. In the primary window M1, manipulation switch window information (i.e., for an audio or air-conditioner) may be displayed so as to be used for adjusting an audio volume, an air-conditioner temperature, an air-conditioner blow quantity, or an audio volume.

Each or any, combination of processes, functions, sections, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a non-transitory computer-readable storage media or can be downloaded via a communications network and then stored in a non-transitory computer-readable storage media.

Aspects of the disclosure described herein are set out in the following clauses.

As an aspect of the disclosure, a manipulation input apparatus is provided as follows. A display device is configured to display a first window and a second window in a side by side arrangement. A display information designation section is configured to designate display information displayed by the display device. A manipulation section is configured to, when the display information displayed by the display device is designated, execute a manipulation within a manipulation region having a predetermined width, and output manipulation information corresponding to the executed manipulation.

A manipulation information acquisition section is configured to acquire the manipulation information outputted from the manipulation section. A first selection position control section is configured to designate a selection position in the first window based on the manipulation information acquired by the manipulation information acquisition section and display a position indicator at the designated selection position. A second selection position control section is configured to designate a selection position in the second window based on the manipulation information acquired by the manipulation information acquisition section and display a position indicator at the designated selection position. Herein, a first manipulation region and a second manipulation region are designated as the manipulation region in the manipulation device. The first manipulation region is used to designate the selection position in the first window. The second manipulation region is used to designate the selection position in the second window. In cases that the manipulation device is manipulated in the first manipulation region when the position indicator is displayed in the first window, the selection position is moved within the first window based on the manipulation device being manipulated while the position indicator is displayed at the moved selection position within the first window. In cases that the manipulation device is manipulated in the second manipulation region when the position indicator is displayed in the second window, the selection position is moved within the second window based on the manipulation device being manipulated while the position indicator is displayed at the moved selection position within the second window. The first manipulation region and the second manipulation region are designated to contain an overlapped region between the first manipulation region and the second manipulation region.

As an optional aspect, the manipulation input apparatus may further comprises: a reactive force device configured to supply a reactive force against the manipulation direction of the manipulation device; and a reaction force control section configured to control a reactive force supplied by the reactive force device. When the position indicator is displayed in the first window, the reactive force control section designates a reactive force supplied by the reactive force device based on the display information in the first window. When the position indicator is displayed in the second window, the reactive force control section designates a reactive force supplied by the reactive force device based on the display information in the second window.

Under the above configuration, the selection position can be guided easily. Therefore, the manipulation device which moves the selection position can be manipulated easily.

As an optional aspect of the manipulation input apparatus, when the position indicator is moved from one window of the first window and the second window to an other window of the first window and the second window, the position indicator may be displayed at an approximately intermediate position within the other window, to which the position indicator is moved from the one window.

Under the above configuration, the display position of the position indicator can be quickly moved to any position within the window, to which the position indicator is moved newly.

It will be obvious to those skilled in the art that various changes may be made in the above-described embodiments of the present invention. However, the scope of the present invention should be determined by the following claims.

What is claimed:
1. A manipulation input apparatus comprising:
a display device configured to display a first window and a second window in a side by side arrangement, the first window and the second window having a wall portion to cross over to transfer to each other;
a display information designation section configured to designate display information displayed by the display device;
a manipulation device configured to, when the display information displayed by the display device is designated,
execute a movement manipulation within a manipulation region having a predetermined width, and
output manipulation information corresponding to the movement manipulation;
a manipulation information acquisition section configured to acquire the manipulation information outputted from the manipulation device;
a first selection position control section configured to designate a first selection position in the first window based on the manipulation information acquired by the manipulation information acquisition section and display a position indicator at the first selection position in a validated state; and
a second selection position control section configured to designate a second selection position in the second window based on the manipulation information acquired by the manipulation information acquisition section and display a position indicator at the second selection position in the validated state,
wherein:
the validated state of the first selection position control section switches to an invalidated state when the first selection position is designated as being crossing over to the wall portion to transfer to the second window, causing the second selection position control section to be in the validated state whereas
the validated state of the second selection position control section switches to the invalidated state when the second selection position is designated as crossing over the wall portion to transfer to the first window, causing the first selection position control section to be in the validated state,
the manipulation region of the manipulation device includes a first manipulation region and a second manipulation region to contain an overlapped region between the first manipulation region and the second manipulation region,
the first manipulation region being used to designate the first selection position in the first window when the first selection position control section is in the validated state,
the second manipulation region being used to designate the second selection position in the second window when the second selection position control section is in the validated state;
in cases that the manipulation device is manipulated in the first manipulation region when the position indicator is displayed in the first window,
the first selection position is moved within the first window based on the manipulation device being manipulated while the position indicator is displayed at the moved first selection position within the first window; and
in cases that the manipulation device is manipulated in the second manipulation region when the position indicator is displayed in the second window,
the second selection position is moved within the second window based on the manipulation device being manipulated while the position indicator is displayed at the moved second selection position within the second window.

2. The manipulation input apparatus according to claim 1, further comprising:
a reactive force device configured to supply a reactive force against a manipulation direction of the manipulation device; and
a reactive force control section configured to control a reactive force supplied by the reactive force device, wherein:
when the position indicator is displayed in the first window,
the reactive force control section designates a reactive force supplied by the reactive force device based on the display information in the first window; and
when the position indicator is displayed in the second window,
the reactive force control section designates a reactive force supplied by the reactive force device based on the display information in the second window.

3. The manipulation input apparatus according to claim 2, wherein
when the position indicator is moved from one window of the first window and the second window to an other window of the first window and the second window,
the position indicator is displayed at an approximately intermediate position within the other window, to which the position indicator is moved from the one window.

4. The manipulation input apparatus according to claim 1, wherein
when the position indicator is moved from one window of the first window and the second window to an other window of the first window and the second window,
the position indicator is displayed at an approximately intermediate position within the other window, to which the position indicator is moved from the one window.

5. The manipulation input apparatus according to claim 2, wherein
a predetermined wall reactive force is supplied by the reactive force device when the position indicator approaches near the wall portion to indicate that the position indicator approaches near the wall portion, the predetermined wall reactive force being different from a predetermined switch reactive force that signifies manipulation of the position indicator to remain within the first window or the second window.

* * * * *